INVENTOR.
JOHN C. SMITHKEY
BY
F. W. Brunner
ATTORNEY

June 30, 1970 J. C. SMITHKEY 3,518,140
METHOD FOR ONE STAGE BUILDING OF RADIAL PLY TIRES BY SANDWICHING
TREAD STRIPS BETWEEN THE RADIAL PLIES BEFORE
EXPANSION TO TIRE FORM
Filed Aug. 10, 1966 2 Sheets-Sheet 2

INVENTOR.
JOHN C. SMITHKEY
BY
*F. W. Brunner*
ATTORNEY

3,518,140
METHOD FOR ONE STAGE BUILDING OF RADIAL PLY TIRES BY SANDWICHING TREAD STRIPS BETWEEN THE RADIAL PLIES BEFORE EXPANSION TO TIRE FORM
John C. Smithkey, Akron, Ohio, assignor to The Goodyear Tire & Rubber Company, Akron, Ohio, a corporation of Ohio
Continuation-in-part of application Ser. No. 444,691, Apr. 1, 1965. This application Aug. 10, 1966, Ser. No. 571,575
Int. Cl. B29h 17/14, 17/26
U.S. Cl. 156—123
1 Claim

ABSTRACT OF THE DISCLOSURE

A pneumatic tire and a method of building the same in which one or more bias type breaker strips are applied between successive radial type carcass plies. The breaker strips are then pantographed upon shaping the tire to its toroidal shape thereby reducing the angle of the cords, decreasing the width of the strip or strips and increasing the length and thickness thereof.

---

Figure 1:
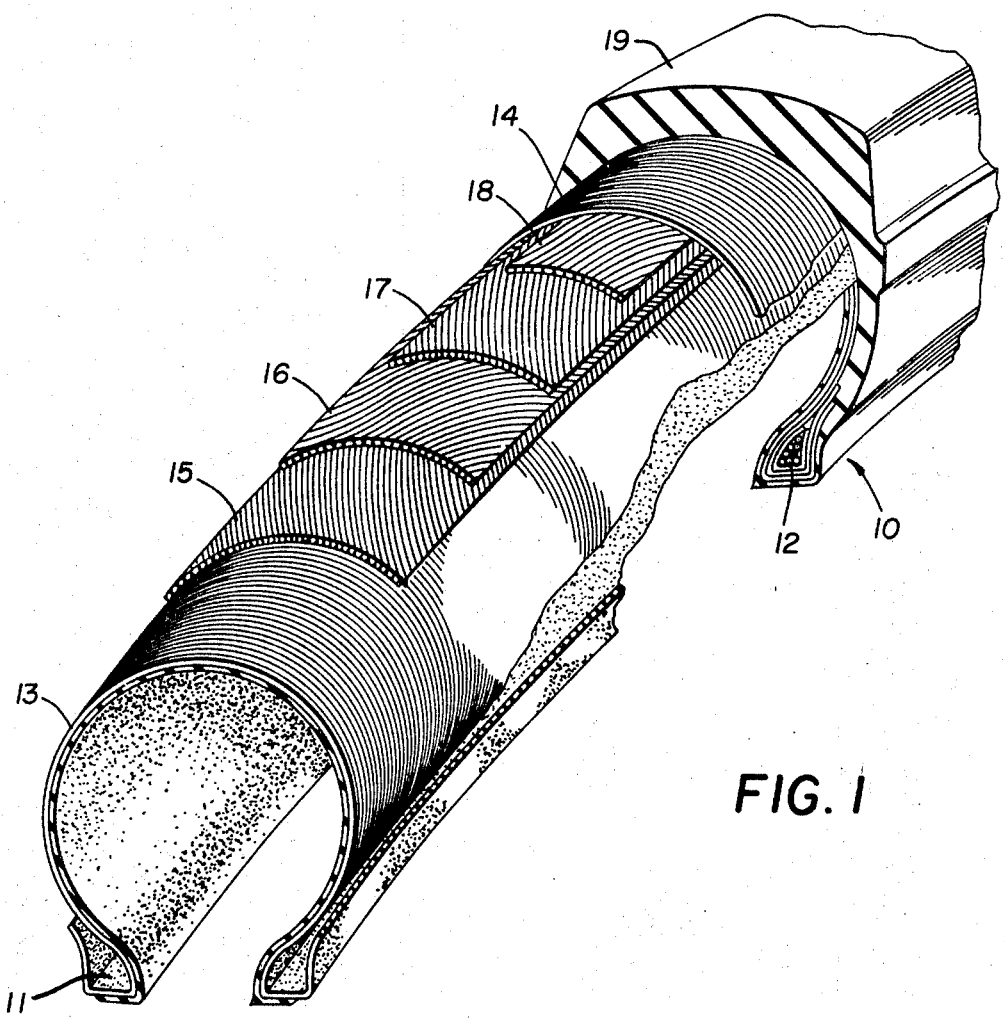

This application is a continuation-in-part of copending application Ser. No. 444,691 filed Apr. 1, 1965, now U.S. Pat. No. 3,409,492.

This invention relates to the art of pneumatic tires and in particular has reference to a new and improved method for building a radial ply tire in "one stage" rather than by the conventional "two stage" method presently known in the prior art.

At the present time radial ply tires are built in two stages with the first stage involving the use of a cylindrical building drum for the purpose of receiving the bead and ply portions of the tire in flat, cylindrical configuration.

Following such building the beads are moved together and the central portion of the plies are expanded to the approximate final diameter following which the circumferentially inextensible breaker elements are applied followed by application of the tread stock.

The tire is then cured to its final configuration.

The "two stage" process above described has heretofore been felt necessary because of the inextensible nature of the breaker strips which have their cord elements normally disposed circumferentially or at a slight angle to the center line of the tire so as to serve as an encircling belt for the pneumatic tire.

It has been discovered however that if the breaker is constructed so that the cord elements thereof extend diagonally of the width that a certain degree of "pantographing" or surface area rearrangement can be attained without losing the desired advantages of radial ply construction.

Stated otherwise, it has been found that if the cord elements of the breaker are disposed at an angle of approximately 45 to 65 degrees with respect to the longitudinal center line of the tire during the time that the tire is being built in its flat form, that the subsequent shaping and expansion will serve to "pantograph" the overall breaker strip so as to sharply reduce the cord angle while increasing the length thereof and simultaneously reducing the width of the breaker.

The net results of such "pantographing" is to change the breaker strip from an original condition wherein the cords are disposed within the range normally making the same a "bias type" breaker, to a condition where the cords are disposed so as to make the breaker strip one of the "belted" type.

In the copending application of John C. Smithkey and Duane O. Yoe, filed Apr. 1, 1965 as Ser. No. 444,691 subsequently converted under the provisions of 35 U.S.C. 116 to a sole application of Duane O Yoe and now U.S. Pat. 3,409,492 there was disclosed a method for building such a tire in accordance with the above described "one stage" process.

While the method and apparatus disclosed in the aforesaid copending application satisfactorily produces tires in accordance with the "one stage" principle herein being discussed, it has nonetheless been found that improved results can be obtained by sandwiching the breaker strips in question between the ply members instead of superimposing the same as was the case in the aforesaid copending application.

Further improvement in this regard can be obtained by progressively decreasing the width of the breaker strips from inside to outside of the tire with the innermost breaker strip being the widest and with the outermost breaker strip being the narrowest in width so as to facilitate more exact forming of the shoulder area of the tire.

Production of an improved tire having the above characteristics accordingly becomes the principal object of this invention, with other objects of the invention becoming more apparent upon a reading of the following brief specification, considered and interpreted in the light of the accompanying drawings.

Figure 2:
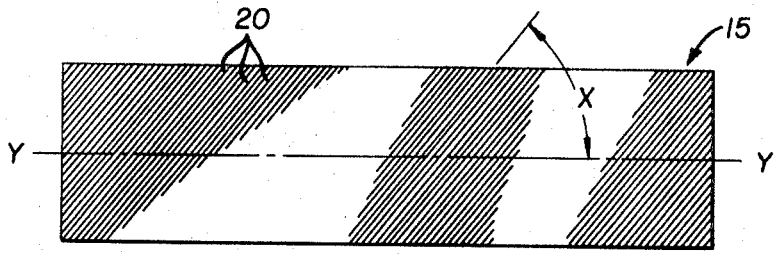
Figure 3:
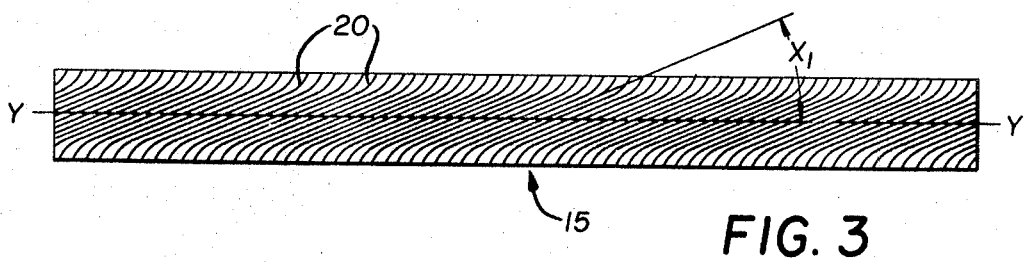
Figure 4:
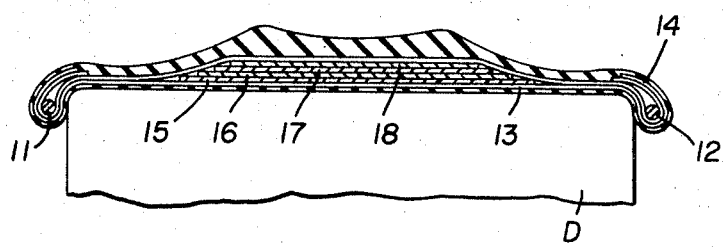
Figure 5:
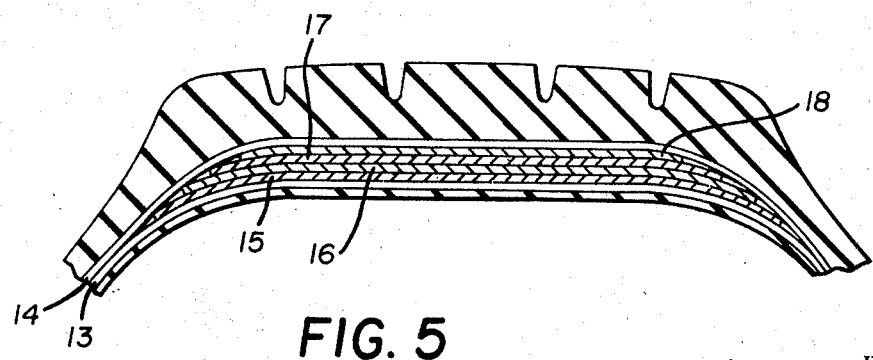

Of the drawings:
FIG. 1 is a perspective view of the improved pneumatic tire.
FIG. 2 is a schematic plan view of the breaker strip shown prior to "pantographing" during the building process.
FIG. 3 is a similar schematic plan view but showing schematically the flat configuration of the breaker strip following "pantographing."
FIG. 4 is a sectional view of the improved tire in its "flat built" form.
FIG. 5 is a sectional view of the same tire after shaping.

Referring now to the drawings and in particular to FIG. 1 thereof, the improved pneumatic tire, generally designated by the numeral 10, is shown including the usual opposed beads 11 and 12, around which are folded building plies 13 and 14, with a series of breakers 15, 16, 17 and 18, being shown successively sandwiched between the plies 13, 14 with such breakers and plies, in turn being covered by a tread portion generally indicated by the numeral 19.

With reference to the construction of the tire carcass per se, the beads 11 and 12 are of course of known construction with the plies 13 and 14 having 90 degree cord elements therein that extend from bead to bead in a fashion well known with respect to the construction of radial tires. Such plies do deviate from "conventional" construction wherein the plies are at a bias angle alternatively superimposed.

With reference to the breakers 15 through 18, the same are shown as having their cord elements 20, 20 disposed at an acute angle X (see FIG. 2) with respect to the longitudinal center line of the tire, with the longitudinal line being shown in FIGS. 2 and 3 as the line Y, Y. While the tire being produced by the disclosure of this invention is a "radial ply" type tire the breakers 15 through 18 that are shown deviate from conventional practice wherein the cords 20, 20 would be disposed in parallel to the line Y—Y so as to be substantially inextensible.

Stated otherwise, in conventional practice both the plies and breakers that were used had approximately similar biased angles. On the other hand, in "radial ply" construction the cords of the ply and the breakers have very dissimilar biased angles.

A modification is present in the present invention where the "radial" tire being built has 90 degree cords that extend transversely from bead-to-bead in the ply, while the breaker cords are initially at an acute angle prior to "pantographing."

It is to be further noted that while only the ply 15 is shown in FIGS. 2 and 3 that the ply 17 would be identical thereto except for slightly increased length, while the plies 16 and 18 would have their cord angles reversed so that the angle X fell below the line Y—Y, as is clearly apparent from FIG. 1.

In practice it has been found that best results will be obtained when the angle X is between 45 and 65 degrees, with limited satisfactory results being obtained beyond this X angle range in instances of lesser or greater "cord count." In this regard it is believed apparent that the "cord count" will affect the initial angle and subsequently the final angle since the closer the cords are initially placed together the less "pantograph" that can occur during radial expansion.

Turning now to FIG. 3 for a consideration of the characteristics of the breaker 15 after shaping, it will be noted that the angle $X_1$ has been materially reduced, while the length of the breaker strip 15 has been increased, with the width thereof being decreased so that the area of the ply 15 in FIG. 3 corresponds substantially to the area of the ply 15 of FIG. 2, with it being understood that some minor variation in area may be encountered due to nesting of the cords and compacting of casing rubber for the same.

As an example of the dimensional changes encountered in manufacture of an 8.15:15 tire, the first breaker cord had a planar dimension of 7.0 inches width by 53.4 inches length with angle X being 50 degrees.

Following shaping, inspection of the same breaker and measurement of the same revealed that the width had decreased to 4.0 inches while the length had expanded to 83.2 inches. The cord angle at the center portion ($X_1$) had changed to 22 degrees.

Mathematically, it will be apparent that the area of the cord has been reduced approximately 10 percent with the original area being 373.8 square inches while the cured area is 332.8 square inches. As indicated before, the thickness of the breaker increased to present an unchanged volume.

In the example just given, the cords in question were spaced fifteen to the inch in the condition of FIG. 2 adjacent line Y—Y, while in the condition of FIG. 3, the spacing had been changed to the point where the cords were spaced eighteen to the inch.

While compacting occurs adjacent the center as just described it is to be noted that little compacting occurred adjacent the breaker edges with such variation in compacting being explaned by the fact that the cords in the breaker edge remain at higher angles and therefore are less compacted.

This controlled compacting of the cords at the center line of the tire results in greater rigidity in this area so. as to take maximum utilization of the radial ply concept while yet permitting a "one stage" operation.

It should be further noted with respect to FIG. 3 that the cords 20, 20 of the breakers 15 through 18 have a tendency to pantograph less adjacent their edges with most of the "pantographing" action taking place in the central area of the breaker, as clearly shown in FIG. 3, where the cords 20, 20 are shown deformed to a somewhat S-shaped configuration. Again it should be noted that the S-shaped configuration is caused by the fact that the cords at their edges tend toward higher angles as the breaker pantographs and decreases in width.

As indicated earlier, the entire carcass of the pneumatic tire has been designed to be built in the flat form for resultant expansion to toroidal configuration in a "one stage" process.

Accordingly, and as shown best in FIGS. 4 and 5, the tread stock material is applied over the breakers and plies as shown in FIG. 4, with the tread section 19 having somewhat different cross sectional profile than is conventionally the case. In this regard, it should be noted that the tread includes the usual body portion 30, as well as two axially spaced tread shoulder portions 31 and 32, with these shoulders 31 and 32 moving toward the center during shaping and curing to produce the finished tread, as indicated by the numeral 33 in FIG. 5 of the drawings.

In use or operation of the improved tire, the fabric ply 13 will first be applied over the drum D, as shown in FIG. 4. Following this, the breakers 15 through 18 will be successively applied as illustrated in FIGS. 1, 4 and 5, and upon application of such breakers, the remaining ply 14 may be superimposed over the breakers and whereupon the beads 11 and 12 may be positioned so as to permit turning up the ends of plies 13 and 14 as clearly shown in FIG. 4. Following this the tread 19 may be applied to complete an uncured tire carcass.

By usual forming equipment (not shown) of conventional nature, the tire may be shaped by moving the bead portions 11 and 12 towards each other, while radially expanding the central crown portion to the approximate position of FIG. 5.

During such shaping, the cords 20, 20 of each breaker will "pantograph" between the positions of FIG. 2 and FIG. 3 and will further have their spacing varied so as to compact the cords in the central area less, with the cord angle dropping from about 50 degrees in FIG. 2 to about 22 degrees in FIG. 3 in the example of the invention previously given.

It should be further noted that during such shaping a rearrangement of tread stock occurs so that the tread shoulder portions 31 and 32 flow toward the center as indicated by the numeral 33 in FIG. 5 of the drawings.

It will be noted that with reference to FIG. 1 that the pantographing of the plies will have been more uniform in view of the fact that the plies 13 and 14, serving as belts, act uniformly on the plies so as to cause substantially uniform pantographing of the same, with the decreasing width increments serving to provide a more properly formed shoulder as clearly evidenced by FIGS. 4 and 5 of the drawings.

I will be seen from the foregoing, that there has been provided a new and improved method of producing "radial ply, belted" tires in a "one stage" building operation.

In this regard, where the phrase "radial ply" has been used, it is to be understood that such terminology refers to tire construction wherein the cords of the fabric or carcass extend from bead to bead at an angle of approximately 90 degrees with respect to the center line of the tire. Obviously, for production purposes, a slight deviation from such 90 degree angle may be utilized to avoid "nesting" of the fabric cords with conventional use of the word "radial ply" indicating a cord angle in excess of 85 degrees.

Likewise, and with reference to the breaker strip elements it has been earlier indicated that the same are generally either a "bias" type or a "belted" type of breaker, with the "belted" type described being operable to restrict radial expansion of the tire while the "bias" type usually does not restrict such expansion or at least not nearly as much. Further, the "bias" type breaker strip normally has a cord angle range approximately the same as that of the carcass plies, while the "belted" type usually has a cord angle of less than 25 degrees.

It will be seen how the applicant's concept envisions converting of the breaker strip from a "bias" type to a "belted" type by "pantographing" the cords during shaping, with such "pantographing" taking place while the breaker is sandwiched with respect to the plies of a radial ply type of carcass.

While a full and complete description of the invention has ben set forth in accordance with the dictates of the patent statutes, it is to be understood that the invention is not intended to be limited to the specific form herein illustrated.

Thus, while fabric cords have been illustrated as being employed, it is to be understood that any suitable cord elements made of any suitable material could be employed without deviating from the principles herein illustrated.

What is claimed is:

1. A method of building a pneumatic tire that includes radial plies and bias breaker strips comprising the steps of;
   (A) sandwiching at least one of said breaker strips between successive plies; and
   (B) pantographing said breaker strips during radial expansion and axial collapse of said plies whereby the length and thickness of said breaker is substantially increased while the width thereof is decreased and the cord angle thereof is reduced.

References Cited

UNITED STATES PATENTS

| | | | |
|---|---|---|---|
| 1,216,654 | 2/1917 | Burk e | 156—124 |
| 2,703,128 | 3/1955 | Darrow | 156—124 X |
| 2,884,044 | 4/1959 | Hulswit et al. | 156—128 |
| 3,127,294 | 3/1964 | Porter | 156—124 X |
| 3,409,492 | 11/1968 | Yoe | 156—132 |

FOREIGN PATENTS 1,290,431  3/1962  France.

JOHN T. GOOLKASIAN, Primary Examiner

C. B. COSBY, Assistant Examiner

U.S. Cl. X.R.

156—133